United States Patent
Tripathy et al.

(10) Patent No.: US 11,334,512 B1
(45) Date of Patent: May 17, 2022

(54) PERIPHERAL ACCESS CONTROL FOR SECONDARY COMMUNICATION CHANNELS IN POWER MANAGEMENT INTEGRATED CIRCUITS

(71) Applicant: QUALCOMM Incorporated, San Diego, CA (US)

(72) Inventors: Aruna Kumar Tripathy, Hyderabad (IN); Uma Mahesh Revuri, San Diego, CA (US); Chris Rosolowski, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/174,886

(22) Filed: Feb. 12, 2021

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01); *G06F 2213/0016* (2013.01)

(58) Field of Classification Search
CPC .......................... G06F 13/4027; G06F 13/4282
See application file for complete search history.

(56) References Cited

U.S. PATENT DOCUMENTS

| 10,725,949 | B2* | 7/2020 | Graif | G06F 1/10 |
| 2012/0131247 | A1* | 5/2012 | Mok | G06F 13/4291 |
| | | | | 710/110 |
| 2018/0181507 | A1* | 6/2018 | Foust | G06F 13/4282 |
| 2018/0189221 | A1* | 7/2018 | Morning-Smith | |
| | | | | G06F 13/4282 |
| 2018/0267916 | A1 | 9/2018 | Mishra et al. | |
| 2018/0348845 | A1* | 12/2018 | Wang | G06F 9/4405 |
| 2019/0079884 | A1* | 3/2019 | Ramsay | G06F 13/1642 |
| 2019/0108149 | A1* | 4/2019 | Graif | G06F 13/364 |
| 2019/0188175 | A1 | 6/2019 | Chun et al. | |
| 2020/0042750 | A1 | 2/2020 | Chun et al. | |
| 2020/0371695 | A1* | 11/2020 | Gopal | G06F 3/0619 |

OTHER PUBLICATIONS

International Search Report and Written Opinion—PCT/US2021/061798—ISA/EPO—dated Feb. 28, 2022.

* cited by examiner

*Primary Examiner* — Henry Tsai
*Assistant Examiner* — Christopher A Daley
(74) *Attorney, Agent, or Firm* — Qualcomm Incorporated

(57) ABSTRACT

Systems, methods, and apparatus managing access to a power management device are disclosed. A system has a primary integrated circuit and a power management integrated circuit. The primary integrated circuit has a communication controller configured to control access to a first serial bus for a plurality of subsystems in the primary integrated circuit. The power management integrated circuit is coupled to the first serial bus and to a second serial bus. An access control circuit in the power management integrated circuit is configured by the primary integrated circuit to control access to the power management integrated circuit through the second serial bus. The primary integrated circuit may be configured to write an access control configuration to the power management integrated circuit. The access control configuration may define write access rights for a secondary integrated circuit coupled to the power management integrated circuit through the second serial bus.

30 Claims, 13 Drawing Sheets

PERIPHERAL ACCESS CONTROL FOR SECONDARY COMMUNICATION CHANNELS IN POWER MANAGEMENT INTEGRATED CIRCUITS

TECHNICAL FIELD

The present disclosure relates generally to serial communication between integrated circuits and more particularly to methods for enforcing access control on primary communication and secondary communication channels.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bus or a parallel bus. General-purpose serial interfaces known in the industry, including the Inter-Integrated Circuit (I2C or $I^2C$) serial bus and its derivatives and alternatives, including interfaces defined by the Mobile Industry Processor Interface (MIPI) Alliance, such as the I3C interface, the system power management interface (SPMI), and the Radio Frequency Front-End (RFFE) interface.

In one example, the I2C serial bus is a serial single-ended computer bus that was intended for use in connecting low-speed peripherals to a processor. Some interfaces provide multi-master buses in which two or more devices can serve as a bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single integrated circuit (IC) device, or provided in multiple IC devices. In a mobile communications device, multiple antennas and radio transceivers may support multiple concurrent RF links.

In increasing numbers of examples, SoCs and other such IC devices used in mobile communication devices are sourced from different manufacturers or are programmed by different suppliers. The use of SoCs from different sources can create operational and security issues for the supplier of the finished mobile communication devices. Rogue software in a third party device may bypass or contravene protocol or security specifications for the mobile communication devices. As mobile communication devices continue to include a greater level of functionality, improved access control techniques are needed to ensure that security and operational protocols are observed and cannot be bypassed by rogue software in IC devices.

SUMMARY

Certain aspects of the disclosure relate to systems, apparatus, methods and techniques that can provide secure access control for devices such as power management devices.

In various aspects of the disclosure, a primary IC and a power management IC. The primary IC has a communication controller and a processing circuit. The communication controller is configured to control access to a first serial bus for a plurality of subsystems in the primary IC. The power management IC has a first bus interface circuit configured to couple the power management IC to the first serial bus, a second bus interface circuit configured to couple the power management IC to a second serial bus and an access control circuit configured to control access to the power management IC through the second serial bus. The processing circuit may be configured to write an access control configuration to the power management IC. The access control configuration may define write access rights for a secondary IC coupled to the power management IC through the second serial bus.

In various aspects of the disclosure, a method for managing access to a power management device includes configuring a communication controller in a primary IC to control access to a power management IC through a first serial bus and configuring an access control circuit in the power management IC to control access to the power management IC through a second serial bus. The primary IC includes a plurality of subsystems. Configuring the access control circuit includes writing an access control configuration to the power management IC, the access control configuration defining write access rights for a secondary IC coupled to the power management IC through the second serial bus.

In various aspects of the disclosure, a processor-readable storage medium has one or more instructions that, when executed by at least one processor of a processing circuit, cause the processing circuit to configure a communication controller in a primary IC to control access to a power management IC through a first serial bus and configure an access control circuit in the power management IC to control access to the power management IC through a second serial bus. The primary IC includes a plurality of subsystems. The access control circuit is configured by writing an access control configuration to the power management IC. The access control configuration defines write access rights for a secondary IC coupled to the power management IC through the second serial bus.

In various aspects of the disclosure, an apparatus for managing access to a power management device includes means for configuring a communication controller in a primary IC to control access to a power management IC through a first serial bus and means for configuring an access control circuit in the power management IC to control access to the power management IC through a second serial bus. The primary IC includes a plurality of subsystems. The means for configuring the access control circuit is configured to write an access control configuration to the power management IC. The access control configuration defining write access rights for a secondary IC coupled to the power management IC through the second serial bus.

DETAILED DESCRIPTION

Figure 1:
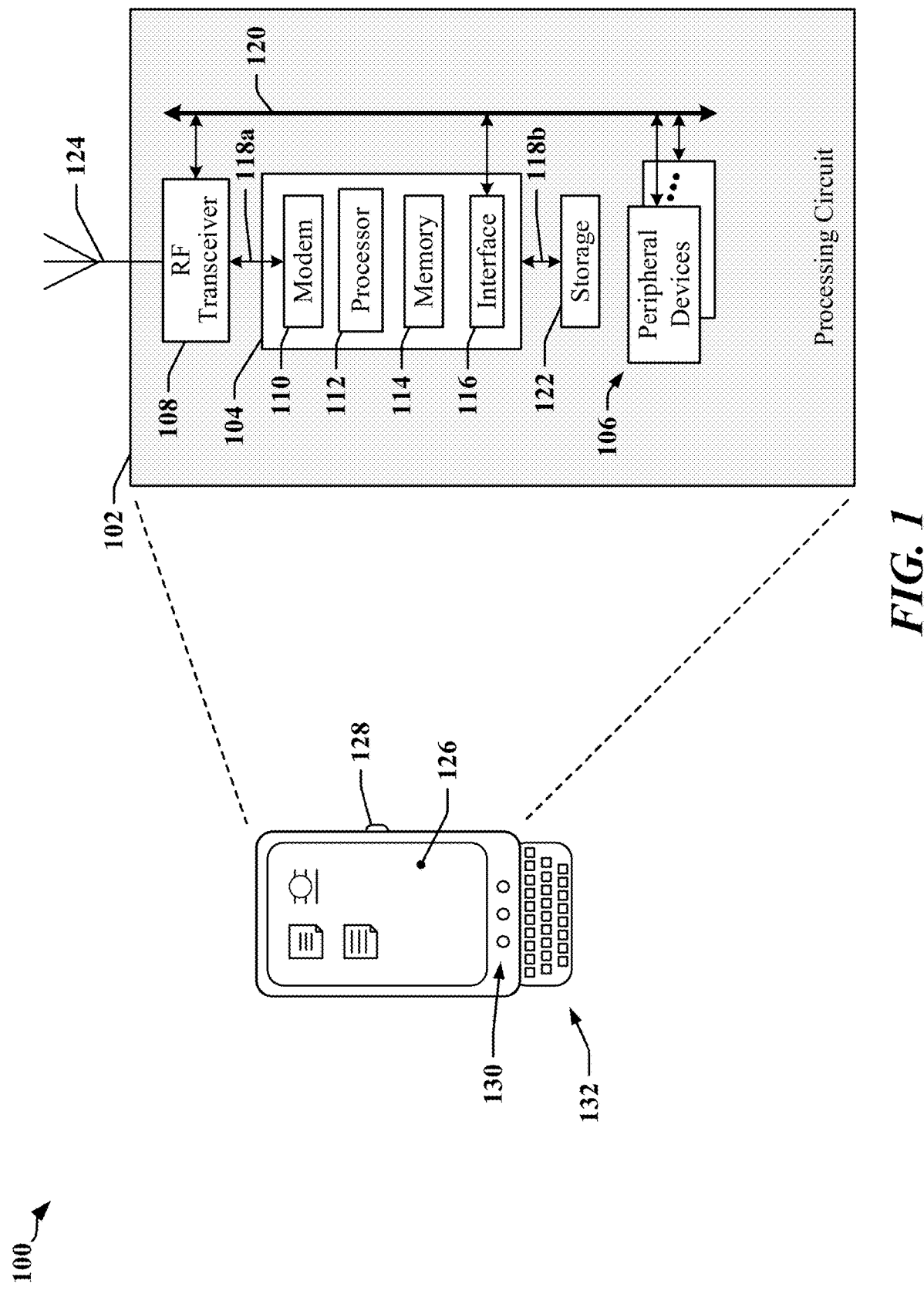
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a shared communication interface that may include a serial bus or other data communication link to connect processors with modems and other peripherals. The serial bus or other data communication link may be operated in accordance with any of a number of standards or protocols. In various examples, a serial bus may be operated in accordance with an I2C protocol, I3C protocol, SPMI protocol and/or RFFE protocol. The serial bus may be deployed to handle high volume, high-priority and/or low-latency data.

In many systems, a power management integrated circuit is provided to control the flow of power to other components including SoCs, and subsystems of SoCs. The control of power flowing to SoCs or other devices can enable the power management integrated circuit to exert a strong influence on system performance, battery longevity and temperature within housings of the system. The power management integrated circuit may be configured through a serial bus by a host or primary SoC or by another managing IC using transactions conducted in accordance with SPMI protocols, for example. Access to the power management integrated circuit may be controlled through the primary SoC in many systems. In some systems, access control may be built into other SoCs or peripherals coupled to the power management integrated circuit. In some examples, a manufacturer of a device may use third-party SoCs or peripherals and may not be able to guarantee that the third-party devices will comply with access control policies defined for the system. In some examples, third party devices may communicate directly with the power management integrated circuit through a secondary channel and beyond the control of the primary SoC. In some instances, the primary SoC may be unable to monitor communications between third-party devices and the power management integrated circuit.

Certain aspects of this disclosure provide systems, apparatus and methods whereby an access control manager in the primary SoC can configure or manage an access control circuit in the power management integrated circuit. The access control circuit in the power management integrated circuit can be configured to enforce access control policy and prevent unauthorized writing to the power management integrated circuit. The use of an access control circuit in the power management integrated circuit can mitigate or prevent the power management integrated circuit from being accessed or changed outside the control of the primary SoC. A method for managing access to a power management device includes configuring a communication controller in a primary SoC to control access to a power management IC through a first serial bus and configuring an access control circuit in the power management IC to control access to the power management IC through a second serial bus. The primary SoC may include a plurality of subsystems. Configuring the access control circuit may include writing an access control configuration to the power management IC, the access control configuration defining write access rights for a secondary SoC coupled to the power management IC through the second serial bus.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
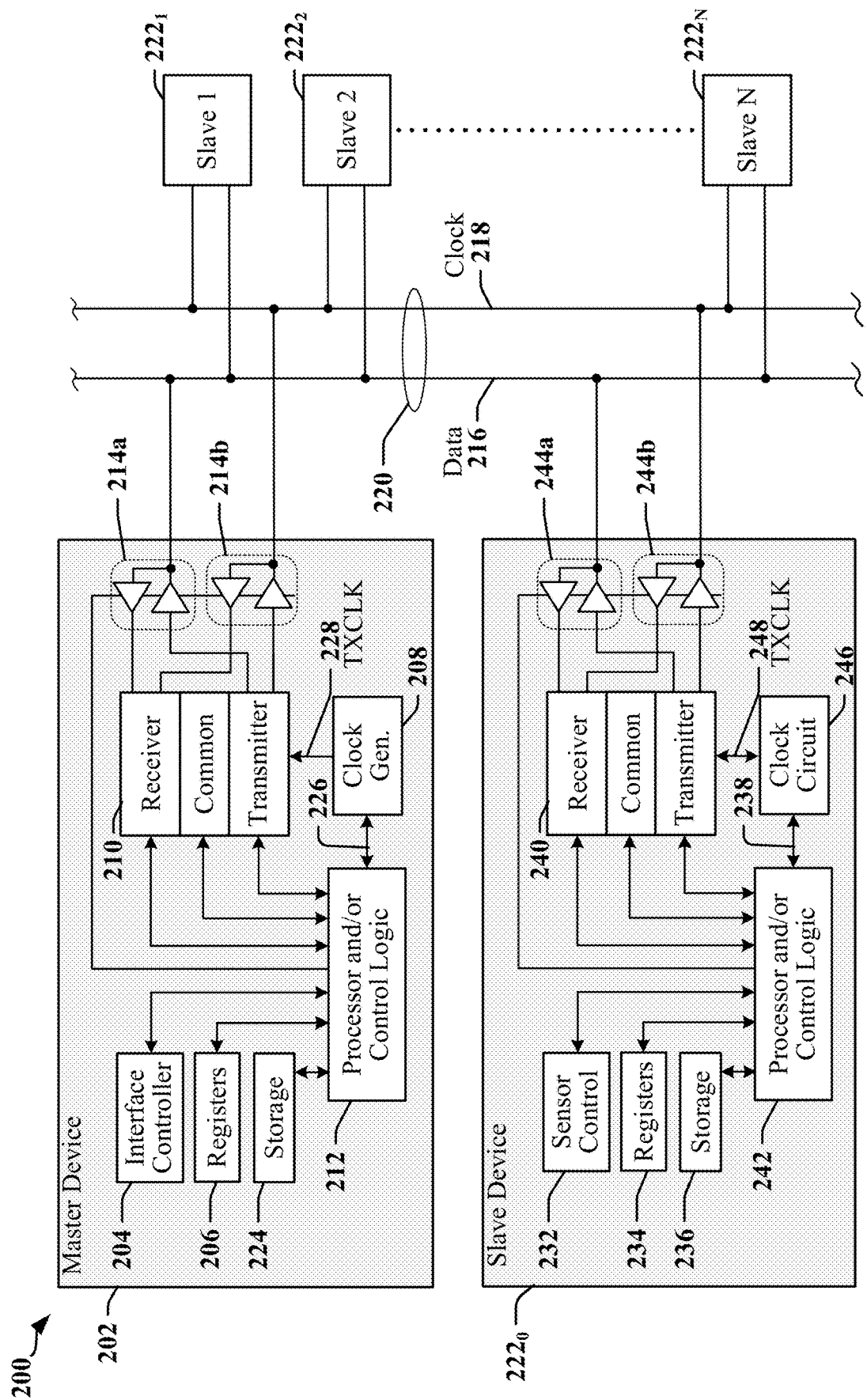
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as applications processors, SoCs or ASICs. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master device 202. Certain types of bus can support multiple bus masters.

In one example, a bus master device 202 may include an interface controller 204 that may manage access to the serial bus, configure dynamic addresses for slave devices $222_0$-$222_N$ and/or generate a clock signal 228 to be transmitted on a clock line 218 of the serial bus 220. The bus master device 202 may include configuration registers 206 or other storage 224, and other control logic 212 configured to handle protocols and/or higher level functions. The control logic 212 may include a processing circuit such as a state machine, sequencer, signal processor or general-purpose processor. The bus master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device 222o configured to operate as a slave device may provide a control function, module or circuit 232 that includes circuits and modules to support a display, an image sensor, and/or circuits and modules that control and communicate with one or more sensors that measure environmental conditions. The slave device 222o may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clocks 238 may be used by the control logic 242 and other functions, circuits or modules.

The serial bus 220 may be operated in accordance with I2C, I3C, SPMI, RFFE, and/or other protocols. A bus master manages communication over the serial bus 220, and typically provides a clock signal that is used to control timing of transmissions. In various examples, one or more devices may be capable of operating as a bus master and devices may contend for control of the serial bus 220 in order to conduct a transaction. In the illustrated example, a bus master device 202 may execute a transaction with one or more slave devices $222_0$-$222_N$ coupled to the serial bus 220.

In an example where the serial bus 220 is operated in accordance with an I3C protocol, devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define certain electrical and timing aspects of signals transmitted on the serial bus 220, in addition to data formats and aspects of bus control. In some aspects, the I2C and I3C protocols may define direct current (DC) characteristics affecting certain signal levels associated with the serial bus 220, and/or alternating current (AC)

characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

Multi-drop interfaces such as I3C, SPMI, RFFE, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of SPMI and RFFE protocols may be employed to illustrate certain aspects disclosed herein. However, the concepts disclosed herein are applicable to other serial bus protocols and standards. Some similarities exist between SPMI and RFFE datagram structures.

Figure 3:
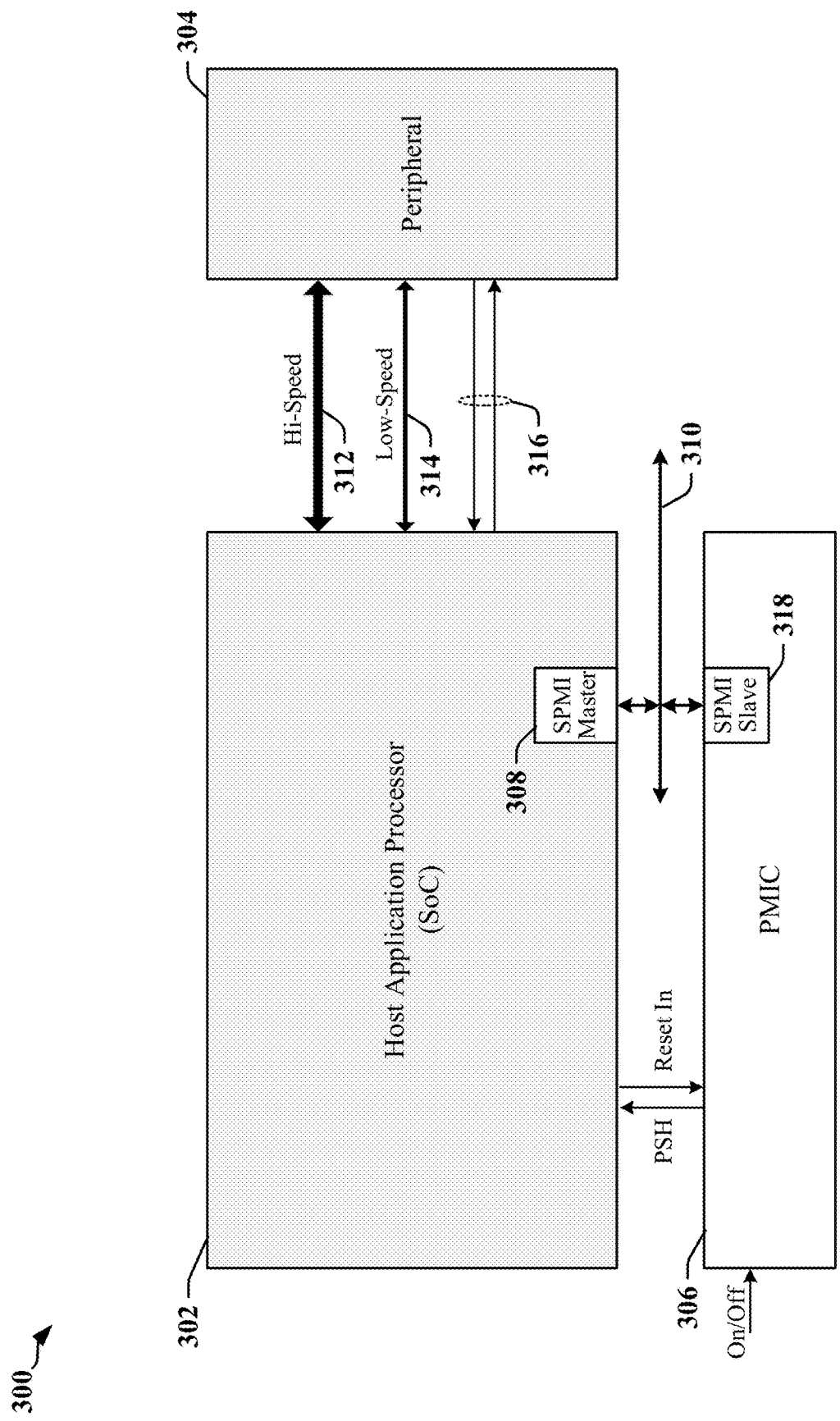
FIG. 3 illustrates an example of a system employing one or more SPMI buses that may be adapted in accordance with certain aspects disclosed herein.

FIG. 3 illustrates an example of a system 300 that employs one or more serial buses 310, 312, 314, 316 each of which can be operated in accordance with a standards-based or proprietary protocol. The system 300 may include an SoC 302 that can include or serve as an application processor or host device on various communication links. The system 300 may have one or more peripherals 304 and a power management integrated circuit (PMIC) such as the PMIC 306. In the illustrated system 300, the peripheral 304 is coupled to the SoC 302 using a high-speed bus 312, low-speed bus 314 and a character-based link 316 implemented using universal asynchronous receiver/transmitters (UARTs) for example. The PMIC 306 is coupled to the SoC 302 over a serial bus 310 through the SPMI bus master 308 and SPMI slave 318. The SPMI bus master 308 manages and controls operations on the serial bus 310 in accordance with SPMI protocols defined by the MIPI Alliance. The protocols are optimized for the real-time control of one or more devices including the PMIC 306. In one example, the high-speed bus 312 may also be operated in accordance with SPMI protocols. The SPMI protocols enable serial buses to operate as shared buses that provide high-speed, low-latency connection for a variety of devices or device types and enable data transmissions to be managed according to priorities assigned to different traffic classes. In some examples, the low-speed bus 314 may be configured as a serial bus and operated in accordance with I2C protocols.

While SPMI protocols may be used to implement a general-purpose communication link, the serial bus 310 operated in accordance with SPMI protocols provides a power management control bus that can communicate commands to cause circuits and/or functional components to reset, sleep, shutdown, wakeup, and so on. SPMI protocols provide for between one and four master devices to be coupled to the serial bus and can support up to 16 slave devices.

A serial bus may include a first wire (SCLK) that carries a clock signal and a second wire that carries a data signal (SDATA). SPMI protocols support bus contention arbitration, request arbitration and group addressing. In some implementations, SPMI supports a low speed mode that operates with a clock frequency of between 32 kHz and 15 MHz, and a high-speed mode that operates with a clock frequency of between 32 kHz and 26 MHz. SPMI devices may be required to acknowledge certain commands.

Figure 4:
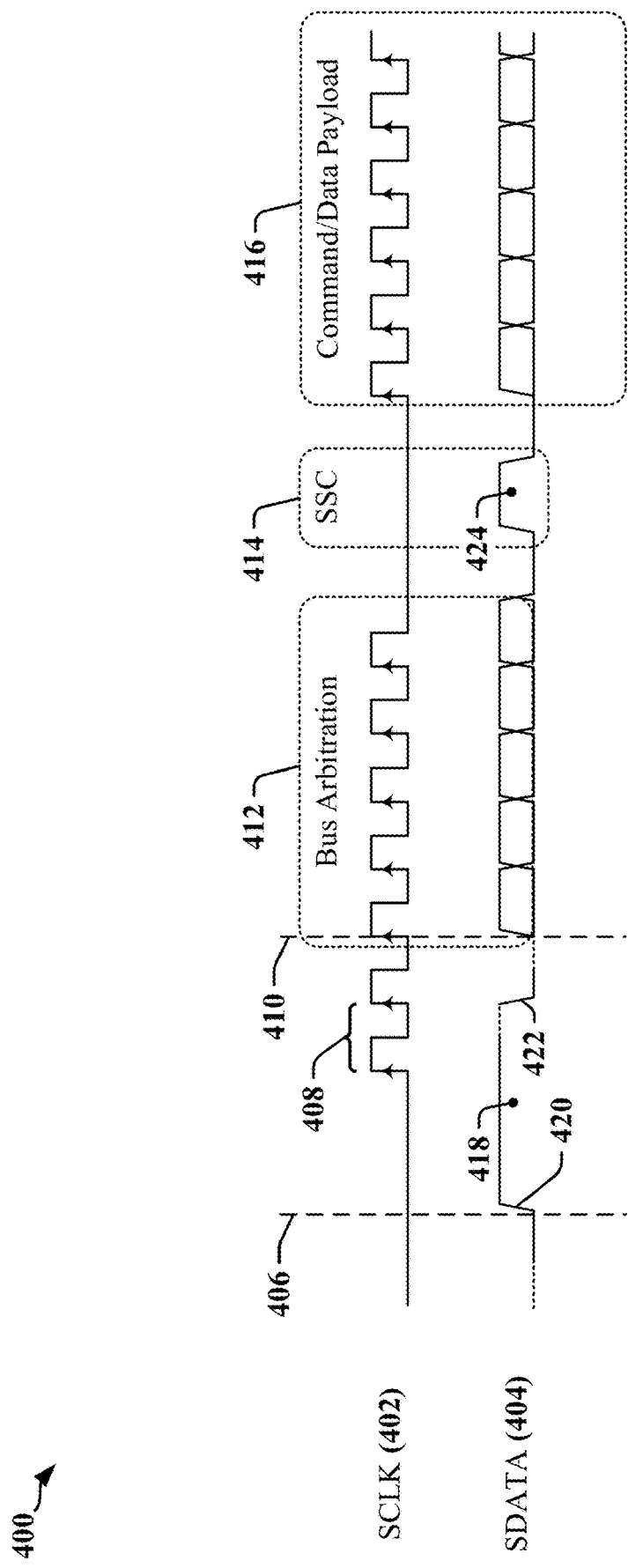
FIG. 4 illustrates an example of timing of an SPMI transaction.

FIG. 4 illustrates certain aspects related to the timing of an SPMI transaction 400 conducted over the serial bus 310 of FIG. 3 and involving the SoC 302 and PMIC 306. In this example, the SoC 302 may be the initiator of the transaction 400. Two or more devices coupled to the serial bus 310 may vie for control of the serial bus, using a priority-based bus arbitration procedure 412. The SoC 302 (the initiator) may initiate the bus arbitration procedure 412 to obtain service by actively initiating a first pulse 418 on SDATA 404 by driving SDATA 404 at a first time 406 such that a transition (rising edge 420) is produced on SDATA 404. Consistent with SPMI protocols, the current bus master 308 provides a clock signal on SCLK 402 after detecting the rising edge 420, and the initiating device releases SDATA 404 during the first clock cycle 408. The bus master then drives SDATA 404 to provide the falling edge 422 of the first pulse 418. The winning device may then provide a Sequence Start Condition (the SSC 414) by transmitting a second pulse 424 on SDATA 404 while the clock signal on SCLK 402 is held in a low signaling state. A Command and Data Payload 416 may then be transmitted on SDATA 404.

Securing Devices Pre-Boot Loader

The PMIC 306 is responsible for controlling the flow of power to various subsystems in the SoC 302 and may control power flow to other SoCs or devices, such as the peripheral 304. The PMIC 306 may be configured through the serial bus 310 using transactions conducted in accordance with SPMI protocols. While the SoC 302 may be configured as the primary device or host device assigned to manage or control the PMIC 306, SPMI protocols support multiple bus master devices and devices other than the designated or configured primary device may be able to reconfigure the PMIC 306. In some examples, access to the PMIC 306 can be controlled through the SoC 302 in order to mitigate or prevent the PMIC 306 from being accessed or changed outside the control of the SoC 302. The concepts disclosed herein can be applied to protect the security of devices other than PMICs. However, the example of a PMIC is used for convenience to illuminate certain aspects of the disclosure.

Figure 5:
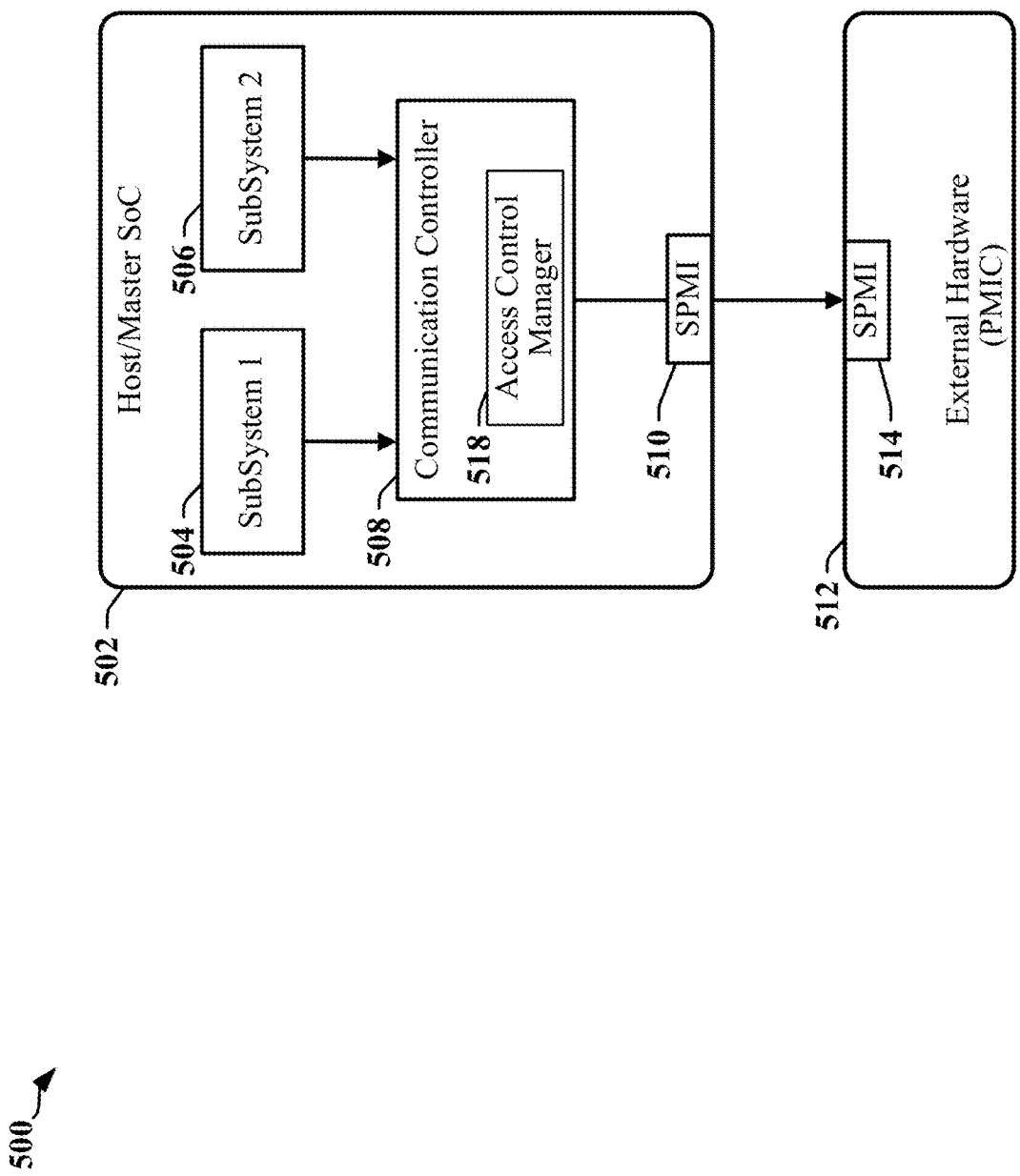
FIG. 5 illustrates access control in an SoC according to certain aspects of this disclosure.

FIG. 5 includes a command flow diagram 500 that illustrates access control in an SoC 502. The SoC 502 includes an access control manager 518 that may be configured to secure access to the PMIC 512 and other devices. The access control manager 518 may be cooperate with or be provided in a communication controller 508. The access control manager 518 may perform a secure check of all requested transactions directed through the SPMI master 510 in SoC 502. The SoC 502 may be referred to herein as a designated host or the primary SoC. In some examples, the access control manager 518 may block or permit SPMI transactions that originate from certain slave addresses (SIDs) or from process identifiers (PIDs). In some examples, the access control manager 518 may block or permit SPMI transactions that are directed to a specific register address or to a register address range. In some examples, the access control manager 518 may block or permit SPMI transactions between certain combinations of SIDs, PIDs, or register address ranges.

Figure 6:
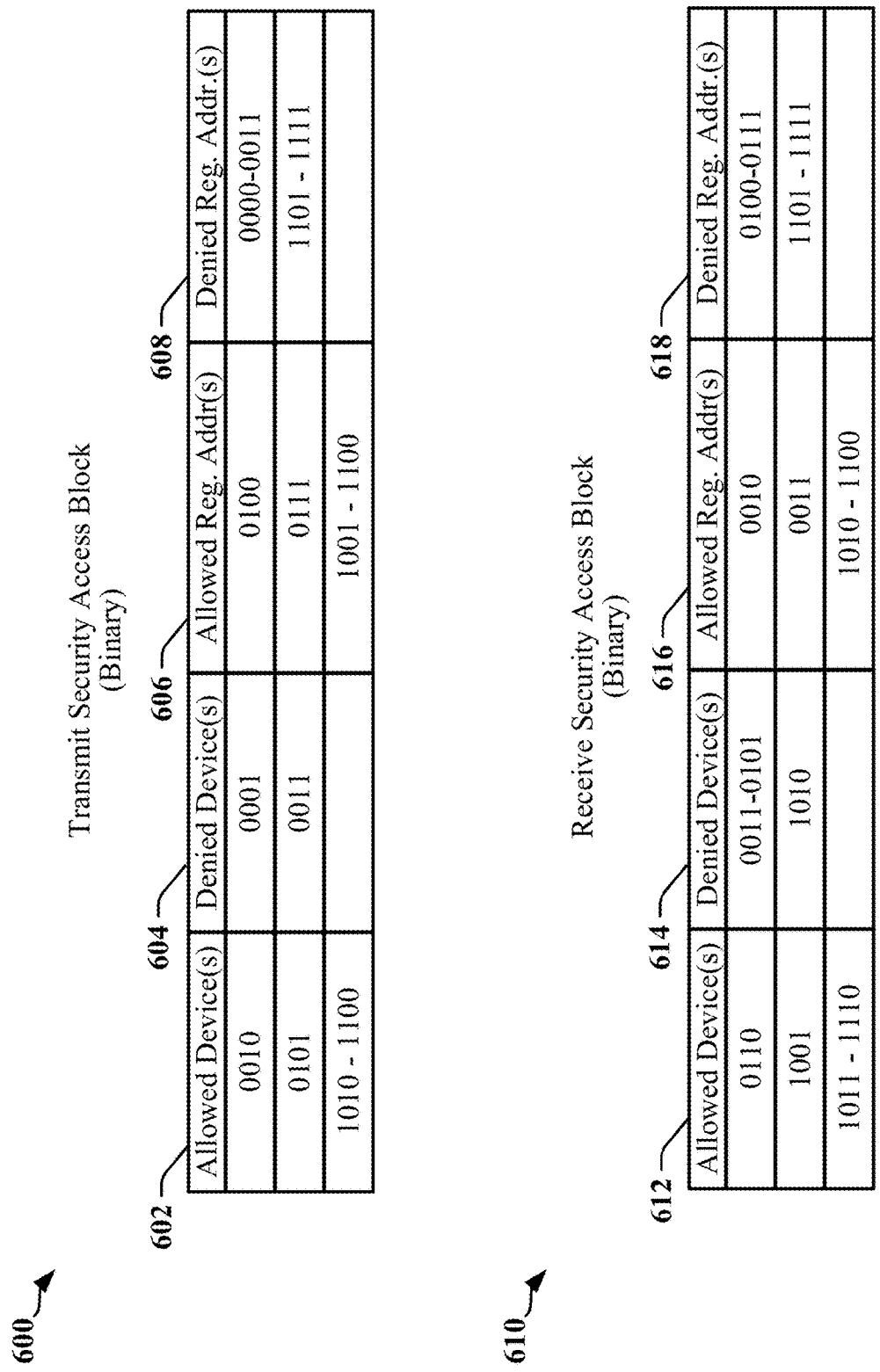
FIG. 6 illustrates examples of security access control blocks configured according to certain aspects of this disclosure.

In some instances, the access control manager 518 may access mappings between permitted or expressly blocked SIDs, PPIDs or Address ranges stored or maintained in security access control blocks. The security access control blocks may be maintained by the communication controller 508, the access control manager 518 or the SPMI Master 510. FIG. 6 illustrates of structure and content of examples of security access control blocks 600, 610. A transmit security access control block 600 may include, for instance, a list of allowed device identifiers 602 (or device identifier ranges) to which commands can be transmitted, a list of denied/blocked device identifier 604 to which commands cannot (or should not) be transmitted, a list of allowed register addresses 606 (or register address ranges) to which commands can be transmitted, and/or a list of denied/blocked register addresses 608 (or register address ranges) to which commands cannot (or should not) be transmitted. A device with such transmit security access control block 600 may permit or allow the transmission of commands (over the bus) that are intended for (or identify) at least one of the allowed device identifiers 602 or allowed register addresses 606. Likewise, a device with such transmit security access control block 600 may block or prevent (e.g., discard) the transmission of commands over the bus which are intended for (or identify) at least one of the denied/blocked device identifiers 604 or denied/blocked register addresses 608.

Similarly, a receive security access control block 610 may include, for instance, a list of allowed device identifiers 612 (or device identifier ranges) from which commands can be received, a list of denied/blocked device identifier 614 from which commands cannot (or should not) be received or processed, a list of allowed register addresses 616 (or register address ranges) from which commands can be received, and/or a list of denied/blocked register addresses 618 (or register address ranges) from which commands cannot (or should not) be received. A device with such receive security access control block 610 may permit or allow the reception or processing of commands (from the bus) that are intended for (or identify) at least one of the allowed device identifiers 612 or allowed register addresses 616. Likewise, a device with such receive security access control block 610 may block or prevent the reception of commands over the bus which are intended for (or identify) at least one of the denied/blocked device identifiers 614 or denied/blocked register addresses 618.

Figure 7:
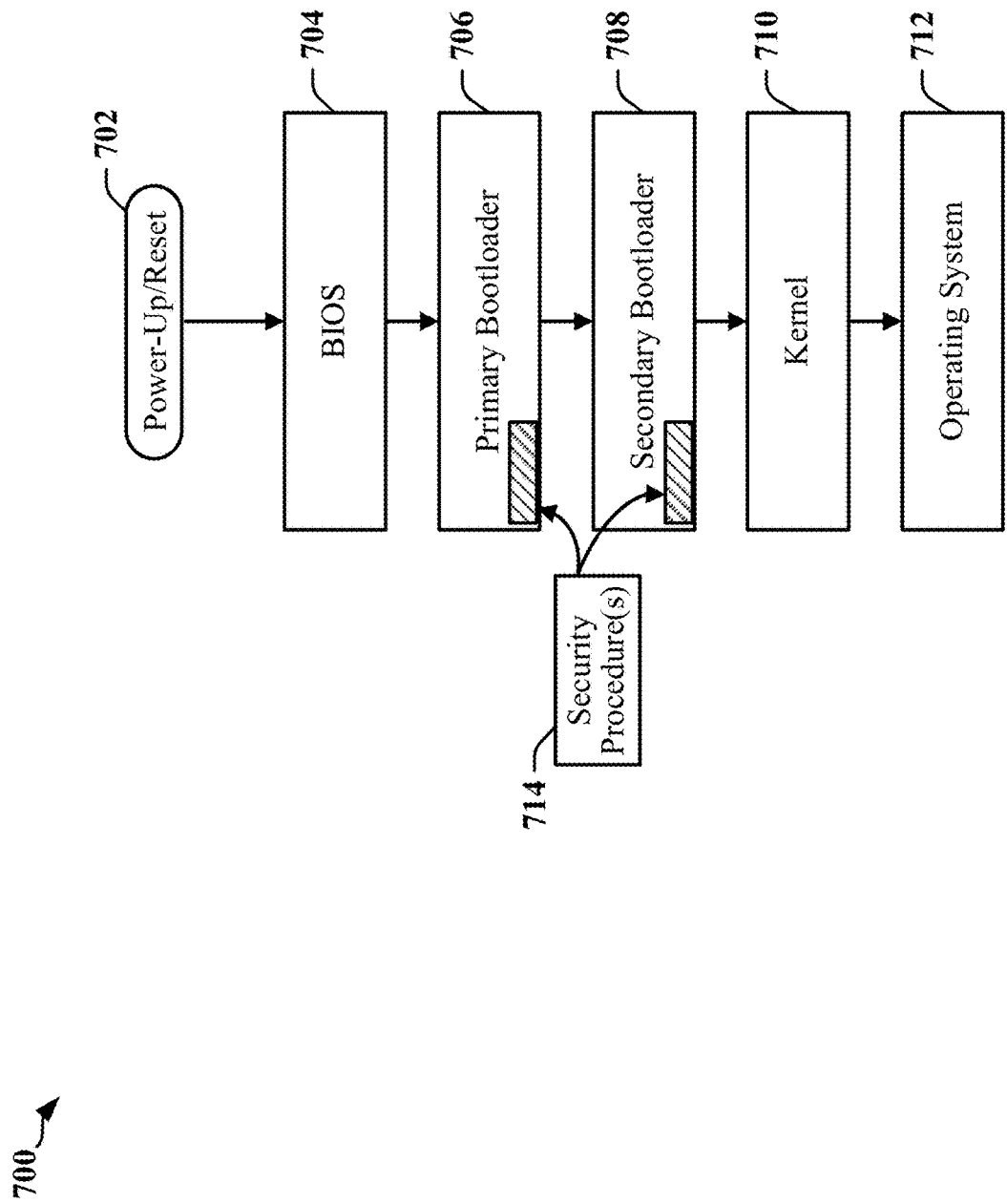
FIG. 7 illustrates a generic power-up or reset sequence for an SoC according to certain aspects of this disclosure.

In some examples, the transmit security access control block 600 and receive security access control block 610 may be generated, decompressed or configured during power-up or initialization of the SoC 502. FIG. 7 illustrates a generic power-up or reset sequence 700 for the SoC 502. Upon a power-up, restart, or reset 702 of a device or system, the SoC 502 may load a basic input/output system the BIOS 704. The BIOS 704 may identify hardware devices in a system for which data flow between identified devices is to be managed. The BIOS 704 may also cause devices coupled to the serial bus to be identified and/or enumerated with a device identifier (SID). The BIOS 704 may also seek and load bootloaders from storage devices within the system. In some implementations, a multi-stage bootloader may be used, such as a primary bootloader 706 and a secondary bootloader 708. In some examples, the primary bootloader 706 may simply serve to load the secondary bootloader 708. The primary bootloader 706 and/or secondary bootloader 708 may execute low-level code that includes instructions that tell one or more of the devices in the system how to start up and find a system kernel. Additionally, the primary bootloader 706 and/or secondary bootloader 708 may include instructions that establish certain security measures or procedures 714 that can restrict operation of some or all devices in the system. In one example, security measures or procedures 714 may restrict or define that devices are able to communicate over a bus, restrict or define devices may perform certain operations over the bus, etc. The security measures or procedures 714 may be implemented by internal protection units such as a system memory management unit (SMMU) or by external protection units (XPU). When the bootloaders 706, 708 have been executed, the secondary bootloader 708 may obtain a kernel image and the kernel 710 may be decompressed, executed and/or initialized. When the kernel 710 completes its operations, an operating system 712 or another high-level system may be initialized or executed.

The access control manager 518 located in the primary SoC 502 can effectively manage SPMI bus operations in a homogeneous system in which all SoCs, peripherals, PMICs 512 and other devices are sourced from a common manufacturer or supplier, or in a heterogeneous system where devices are sourced from multiple manufacturers or suppliers but where each manufacturer or supplier is trusted and all devices comply with access control policies. In one example, a manufacturer or supplier may be trusted when there is no expectation that devices provided by the manufacturer or supplier will reconfigure the PMIC in any unauthorized manner or bypass access controls.

Figure 8:
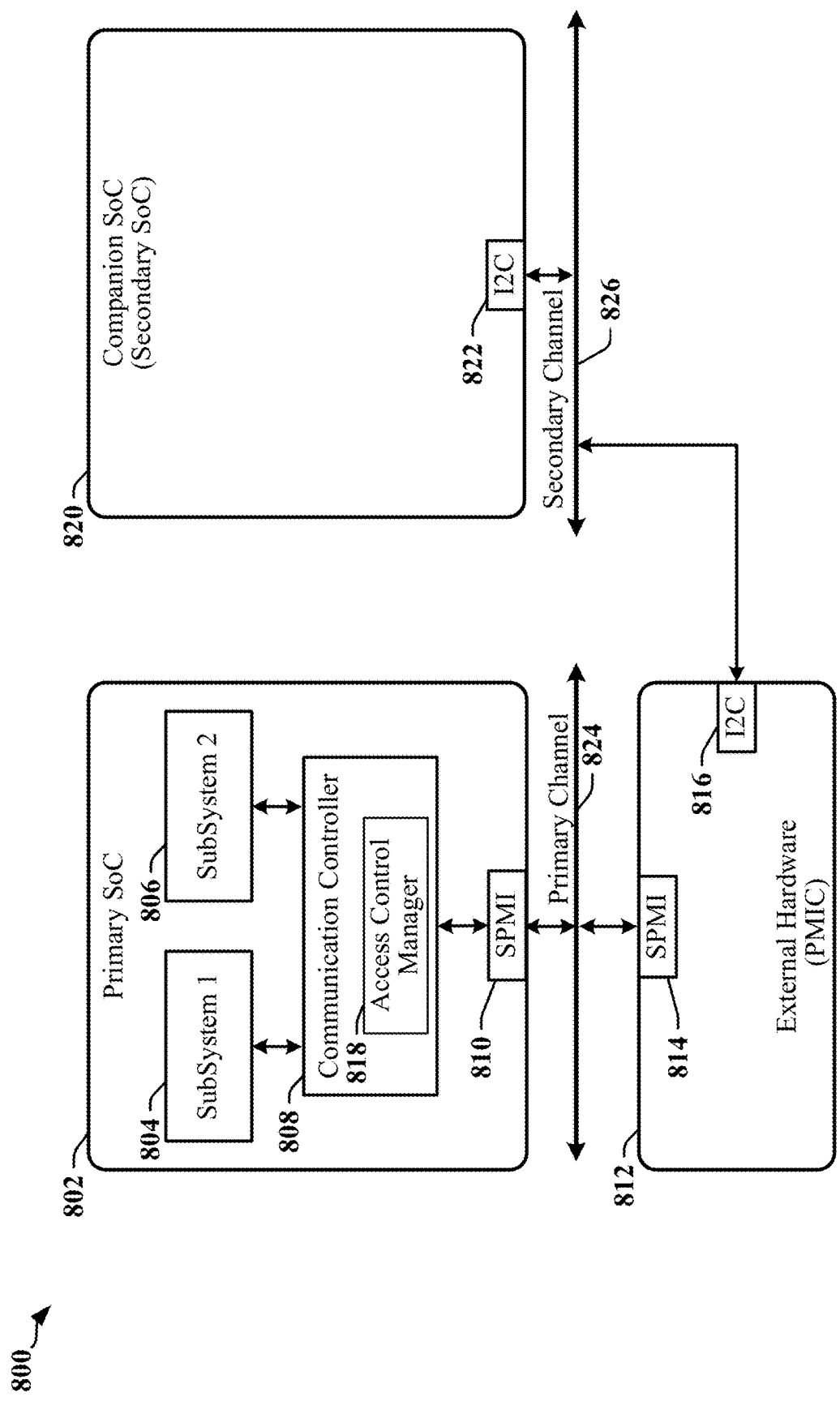
FIG. 8 illustrates a system that includes devices sourced from more than one manufacturer or supplier according to certain aspects of this disclosure.

FIG. 8 illustrates a system 800 that includes devices 802, 812, 820 that are sourced from more than one manufacturer or supplier. In this example, a host or primary SoC 802 includes a communication controller 808 that acts as an arbiter and includes an access control manager 818. The access control manager 818 can be configured to control access to a primary communication channel 824. The primary communication channel 824 may be implemented using a serial bus operated in accordance with an SPMI protocol. The access control manager 818 can enforce an access control configuration using the communication controller 808 to control access to the SPMI interface 810. Requests by subsystems 804, 806 implemented in the host or master SoC 802 to write to the PMIC 812 may be denied or blocked by the communication controller 808 under the control or through the operation of the access control manager 818. Requests by SoCs, peripherals or other devices that communicate with the PMIC 812 through the host or master SoC 802 may be denied or blocked by the access control manager 818. The host or master SoC 802 may be unable to deny or block requests by SoCs 820, peripherals or other devices that communicate directly with the PMIC 812.

In the illustrated example, a companion SoC 820 can communicate directly with the PMIC 812 over a secondary communication channel 826. In this example, the secondary communication channel 826 is implemented using a serial bus operated in accordance with an I2C protocol. The companion SoC 820 has an I2C bus interface circuit 822 under its independent control and the PMIC 812 has an I2C bus interface circuit 816 that operates independently of its SPMI bus interface circuit 814. In other examples, the companion SoC 820 may include an SPMI bus master interface circuit that enables the companion SoC 820 to take control of the primary communication channel 824 and bypass the access control manager 818 of the host or master SoC 802.

The example provided in FIG. 8 illustrates a configuration of devices in which access control can be challenging. The access control manager 818 of the primary SoC 802 is unable to enforce access control for the PMIC 812 when the companion SoC 820 can write directly to the PMIC 812 over the secondary communication channel 826. In some examples, multiple companion SoCs 820 might desire or need to control the PMIC 812 and may be configured to use one or more secondary communication channels 826 to accomplish such control. In some examples, the secondary communication channels 826 may be operated independently of the primary communication channel 824 and may be implemented using a serial bus for conducting transactions in accordance with SPMI or I2C protocols, for example. The primary SoC 802 that has an established root of trust can exercise access control through the primary communication channel 824 but has no ability to enforce access control policy on other companion SoCs 820 that use the secondary communication channel 826 and can violate access control policy at will.

A PMIC configured according to certain aspects of this disclosure can cooperate with a primary SoC with established root of trust to exercise access control for the PMIC over access requests received from secondary communication channels through companion SoCs.

Figure 9:
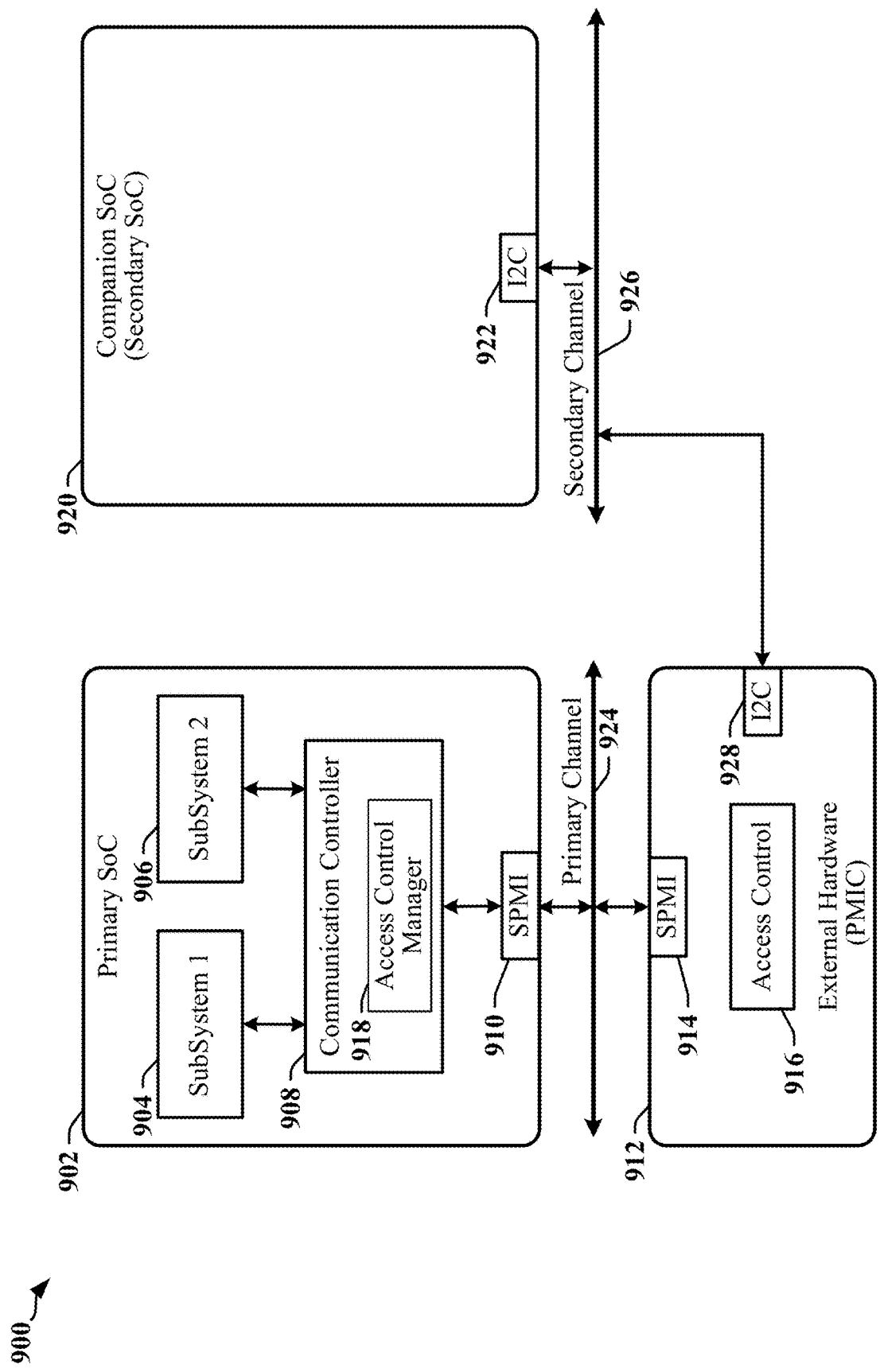
FIG. 9 illustrates a system that includes a power management integrated circuit configured with access control circuit in accordance with certain aspects of this disclosure.

FIG. 9 illustrates a system 900 that includes a PMIC 912 configured with an access control circuit 916 or module that can be configured to enforce access control over the secondary communication channel 926 in accordance with certain aspects of this disclosure. In this example, a primary SoC 902 includes a communication controller 908 that acts as an arbiter and includes or cooperates with an access control manager 918. The access control manager 918 can be configured to control access to a primary communication channel 924. The primary communication channel 924 may be implemented using a serial bus operated in accordance with an SPMI protocol. The access control manager 918 can enforce an access control configuration by controlling access to the SPMI bus interface circuit 910 through the communication controller 908. Requests by subsystems 904, 906 in the host or master SoC 902 to write to the PMIC 912 may be denied or blocked by the communication controller 908 through the operation of the access control manager 918. In one example, the access control manager 918 may interact with an arbiter used to select between the requests made by the subsystems 904, 906. Requests by SoCs, peripherals or other devices that communicate with the PMIC 912 through the primary SoC 902 may be similarly denied or blocked by the access control manager 918. The primary SoC 902 may be unable to directly block requests by SoCs, peripherals or other devices that communicate directly with the PMIC 912.

The access control circuit 916 or module in the PMIC 912 may be configured by the access control manager 918 or by a controller in the primary SoC 902. At power-on or after a reset or restart event, the access control circuit 916 or module in the PMIC 912 may load an initial configuration that prevents access to the PMIC from all sources except the access control manager 918 or a trusted controller in the primary SoC 902. During initialization, the primary SoC 902 may configure the access control circuit 916 or module in the PMIC 912 with access control policies that govern the secondary channel bus interface circuit 928 and/or access requests or attempts from device addresses associated with one or more companion SoCs 920. In one example, the device addresses include unique master or slave device identifiers used in transactions or commands exchanged over a bus operated in accordance with I2C, SPMI or other protocol.

In the illustrated example, a companion SoC 920 can communicate directly with the PMIC 912 over a secondary communication channel 926. In this example, the secondary communication channel 926 is implemented using a serial bus operated in accordance with an I2C protocol. The companion SoC 920 has an I2C bus interface circuit 922 under its independent control and the PMIC 912 has an I2C bus interface circuit 928 that operates independently of its SPMI bus interface circuit 914. In other examples, the companion SoC 920 may include an SPMI bus master interface circuit that enables the companion SoC 920 to take control of the primary communication channel 924 and thereby bypass the access control manager 918 of the primary SoC 902. The access control circuit 916 or module in the PMIC 912 can enforce access control policy defined for the access control manager 918. Acting as a delegate, the access control circuit 916 or module can prevent the PMIC 912 from processing or otherwise responding to unauthorized commands sent by the companion SoC 920. Acting as a delegate, the access control circuit 916 or module may permit response to authorized commands writes by the companion SoC 920. In one example, the access control circuit 916 or module in the PMIC 912 may distinguish between authorized and unauthorized commands based on information similar to the security access control blocks 600, 610 in FIG. 6, which may be maintained in storage or in a lookup table. In another example, the access control circuit 916 or module in the PMIC 912 may distinguish between authorized and unauthorized commands based on the type of commands received at the PMIC 912. In another example, the access control circuit 916 or module in the PMIC 912 may distinguish between authorized and unauthorized commands based on the source of the commands.

According to certain aspects, the access control circuit 916 or module in the PMIC 912 can control peripheral access to the PMIC 912 based on type and value of the identifier from which a command is received. In the example of a secondary communication channel 926 operated using I2C protocols, the access control circuit 916 or module in the PMIC 912 may be configured to accept commands from preconfigured I2C master identifiers associated with trusted SoCs or peripherals. A list of trusted identifiers may be configured by a controller in the secured root of trust (e.g., the primary SoC 902) using the primary communication channel 924, through respective SPMI bus interface circuits 910, 914. Security of the primary SoC 902 may be ensured by delegating access control enforcement for the companion SoC 920 to the access control circuit 916 or module in the PMIC 912, thereby eliminating or limiting the need for the companion SoC 920 to access or interact with the primary SoC 902.

Figure 10:
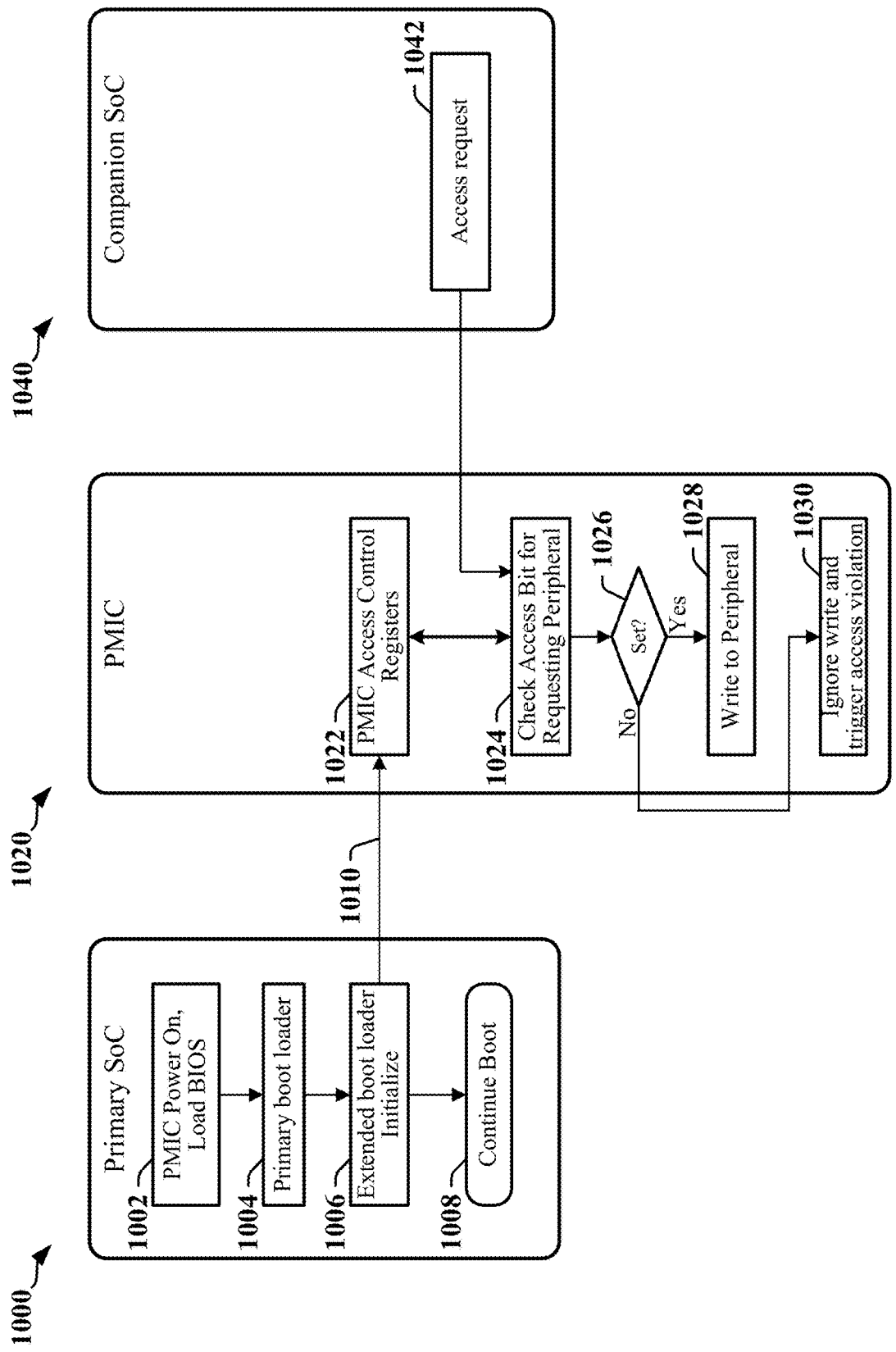
FIG. 10 illustrates a power-up or reset sequence and access control procedures using a power management integrated circuit configured with access control circuit in accordance with certain aspects of this disclosure the system.

FIG. 10 illustrates an example of a power-up or reset sequence and access control procedures for the system 900 illustrated in FIG. 9. The power-up or reset sequence involves an exchange between the primary SoC 1000 and a PMIC 1020 that has been configured with an access control circuit 916 or module in accordance with certain aspects of this disclosure. Upon a power-up, restart, or reset 1002 of a device or system, the primary SoC 1000 may load a BIOS. The BIOS may identify hardware devices in a system for which data flow between identified devices is to be managed. The BIOS may also cause devices coupled to one or more serial buses to be identified and/or enumerated with a device identifier (e.g., a slave ID). The BIOS may also seek and load bootloaders from storage devices within the system. In some examples, a multi-stage bootloader may be used, and may include a primary bootloader 1004 and a secondary or extended bootloader 1006. In some examples, the primary bootloader 1004 may simply serve to load one or more secondary bootloaders, including the extended bootloader 1006. The primary bootloader 1004 and/or secondary bootloaders may execute low-level code that includes instructions that tell one or more of the devices in the system how to start up and find a system kernel.

The primary bootloader 1004, one or more secondary bootloaders and the extended bootloader 1006 may include instructions that establish certain security measures or procedures that can restrict operation of some or all devices in the system. In one example, security measures or procedures may restrict or define the devices that are able to communicate with the PMIC 1020, the commands that the PMIC 1020 will respond to or that restrict memory regions of the PMIC 1020 that are accessible to one or more companion SoCs 1040 or through the primary SoC 1000.

The security measures or procedures may be implemented by a combination of an access manager in the primary SoC 1000 and an access control circuit in the PMIC 1020. The extended bootloader 1006 may include instructions that cause the primary SoC 1000 to write configuration information to access control registers 1022 in the PMIC 1020. In one example, the access control registers 1022 may be configured to implement the security access control blocks 600, 610 illustrated in FIG. 6. In some examples, the access control circuit or module in the PMIC 1020 may be initially configured to permit access to the PMIC 1020 from the primary SoC 1000 and to block access to the PMIC 1020 by other devices. In some examples, the access control circuit or module in the PMIC 1020 may be initially configured to permit access to the PMIC 1020 through a primary communication channel and to block access to the PMIC 1020 through one or more secondary communication channels. The extended bootloader 1006 may perform other boot or initialization procedures 1008 after configuring access control enforcement in the primary SoC 1000 and the PMIC 1020.

The access control circuit or module in the PMIC 1020 may permit certain commands or transactions to be initiated by a companion SoC 1040 after the access control registers 1022 have been configured based on access control policy defined by the primary SoC 1000. The PMIC 1020 may include a logic circuit 1024 that determines whether a command or request 1042 received from the companion SoC 1040 is authorized by access control policy. In one example, the PMIC 1020 may determine whether the command or request 1042 is directed to an authorized register or register space in the PMIC 1020. In another example, the PMIC 1020 may determine whether the command or request 1042 is received from an authorized device address. In another example, the PMIC 1020 may determine whether the command or request 1042 is received from an authorized bus interface. Decision logic 1026 may determine that the requested transaction is authorized and may permit the transaction to proceed, including permitting, for example, a write 1028 to a peripheral in the PMIC 1020. The PMIC 1020 may ignore 1030 the command or request 1042 when the decision logic 1026 determines that the command or request 1042 is unauthorized.

Examples of Processing Circuits and Methods

Figure 11:
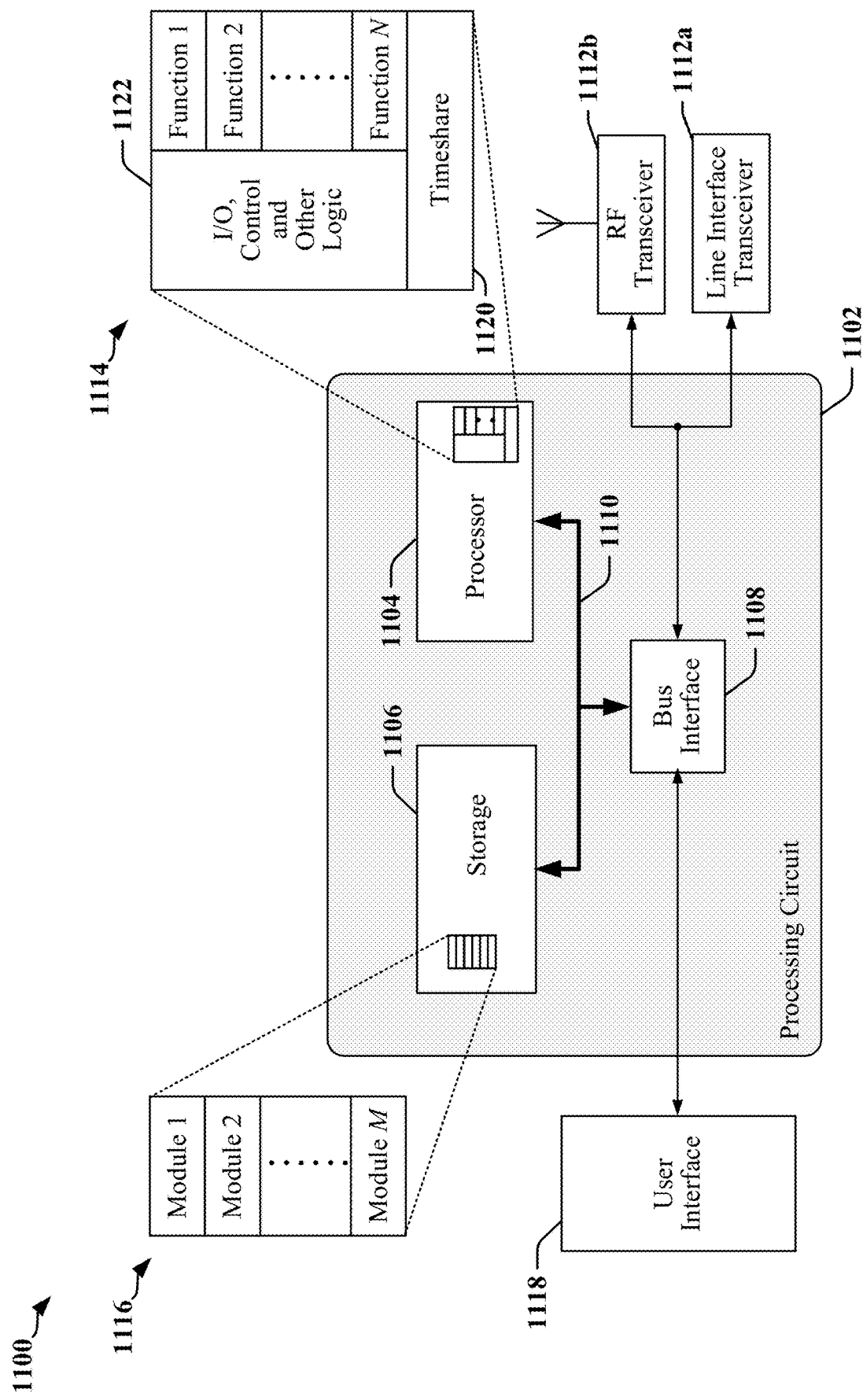
FIG. 11 illustrates one example of an apparatus employing a processing circuit that may be adapted according to certain aspects disclosed herein.

FIG. 11 is a diagram illustrating an example of a hardware implementation for an apparatus 1100 employing a processing circuit 1102. The processing circuit 1102 may include or configure the operation of a finite state machine. In some examples, the apparatus 1100 may perform one or more functions disclosed herein. In accordance with various aspects of the disclosure, an element, or any portion of an element, or any combination of elements as disclosed herein may be implemented using a processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices and may be referred to herein as computer-readable media and/or processor-readable media.

In some examples, the storage 1106 includes registers used to communicate virtual GPIO information. One set of registers may be configured to maintain address, management and payload information corresponding to a physical GPIO and one or more devices to which virtual GPIO information is transmitted. Another set of registers may maintain information in a format corresponding to the one or more devices to which the virtual GPIO information is transmitted.

The bus 1110 may also link various other circuits such as timing sources, timers, peripherals, voltage regulators, and power management circuits. A bus interface 1108 may provide an interface between the bus 1110 and one or more transceivers 1112a, 1112b. A transceiver 1112a, 1112b may be provided for each networking technology supported by the processing circuit. In some instances, multiple networking technologies may share some or all of the circuitry or processing modules found in a transceiver 1112a, 1112b. Each transceiver 1112a, 1112b provides a means for communicating with various other apparatus over a transmission medium. In one example, a transceiver 1112a may be used to couple the apparatus 1100 to a multi-wire bus. In another example, a transceiver 1112b may be used to connect the apparatus 1100 to a radio access network. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the transceiver 1112a, 1112b, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the transceiver 1112a, 1112b, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112a, 1112b, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
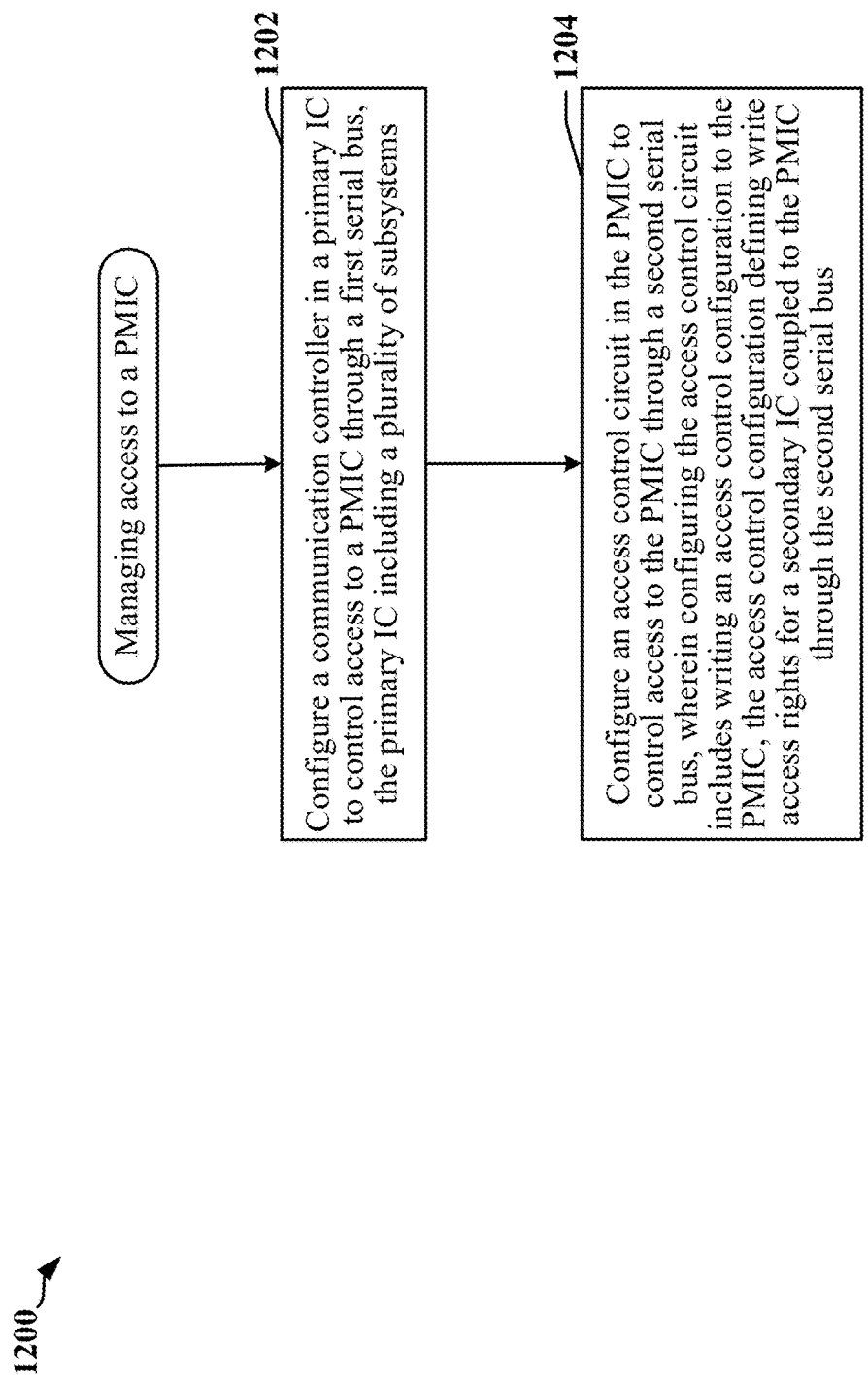
FIG. 12 is a third flowchart illustrating certain operations of device adapted in accordance with certain aspects disclosed herein.

FIG. 12 is a flowchart 1200 of a method for managing access to a power management device. The power management device may include a PMIC that is coupled to a primary SoC through a serial bus. In one example the serial bus is operated in accordance with an SPMI protocol. In other examples, the serial bus may be operated in accordance with an I2C, I3C, RFFE or other protocol.

At block 1202, a communication controller in a primary IC may be configured to control access to a PMIC through a first serial bus, the primary IC including a plurality of subsystems. The IC may be an SoC. At block 1204, an access control circuit in the PMIC may be configured to control access to the PMIC through a second serial bus. The access control circuit may be configured by writing an access control configuration to the PMIC. The access control configuration may define write access rights for a secondary IC coupled to the PMIC through the second serial bus.

In some examples, an access control manager in the primary IC may be configured to block write commands directed to at least one register in the PMIC through the primary IC or directed to the PMIC by one of the plurality of subsystems in the primary IC. The access control configuration may be written to the PMIC during an initialization following a system or device restart, reset or power on event. The access control manager may be configured during the initialization. The PMIC may be configured to ignore write commands received from the second serial bus following the system or device restart, reset or power on event and before the access control configuration is written to the PMIC. The access control circuit in the PMIC may be configured to block write commands received from the second serial bus and directed to a first register in the PMIC that is identified by the access control configuration as inaccessible through the second serial bus.

In some examples, the access control circuit in the PMIC may be configured to block write commands received from the secondary IC and directed to a first register in the PMIC that is identified by the access control configuration as inaccessible from the secondary IC. In some examples, the access control circuit in the PMIC may be configured to ignore write commands received from the second serial bus when the write commands include a device address identified for blocking by the access control configuration.

In some examples, the first serial bus is operated in accordance with a SPMI protocol. In some examples, the second serial bus is operated in accordance with an I2C protocol.

Figure 13:
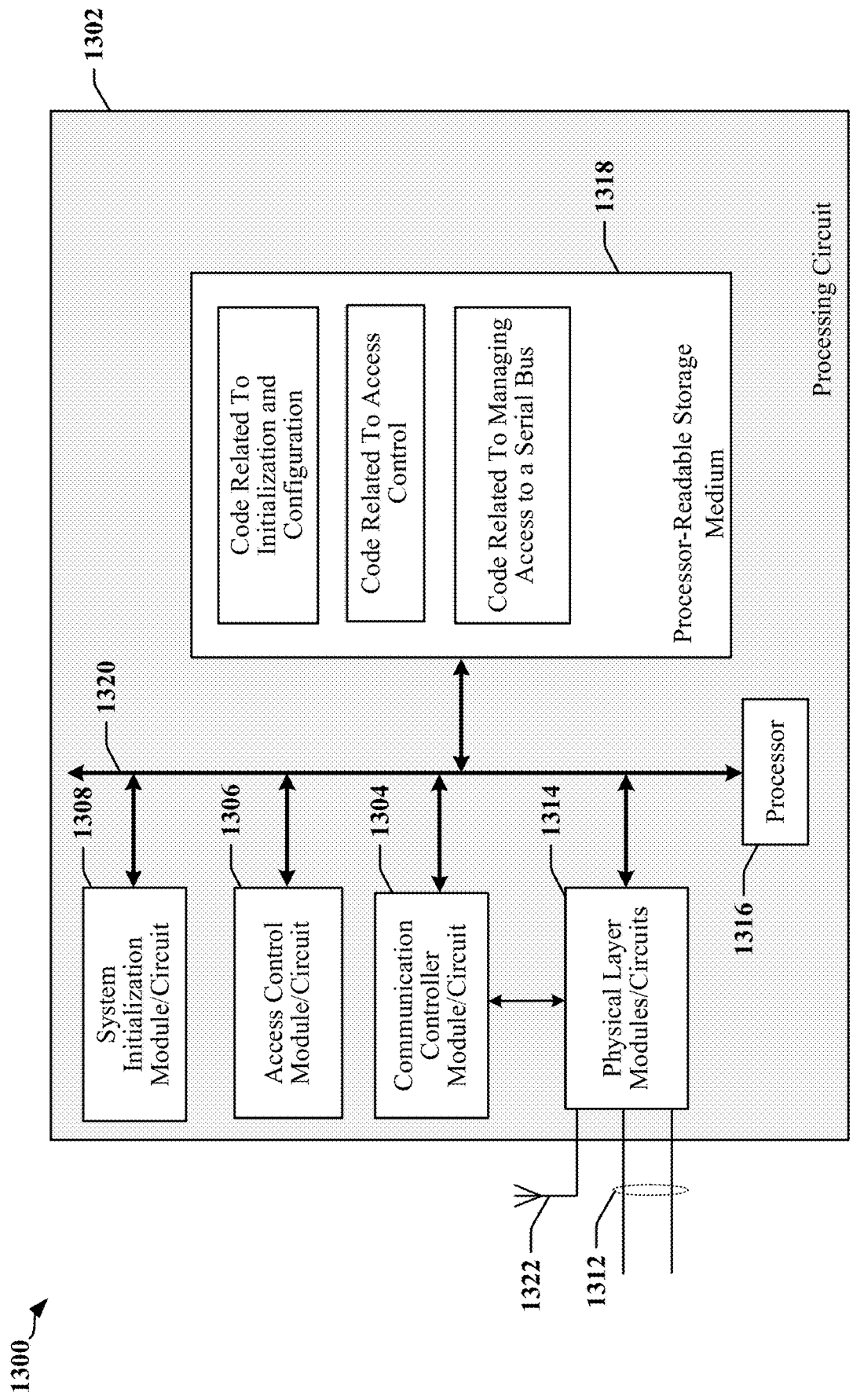
FIG. 13 illustrates an example of a hardware implementation for an apparatus adapted in accordance with certain aspects disclosed herein.

FIG. 13 is a diagram illustrating an example of a hardware implementation for an apparatus 1300 employing a processing circuit 1302. The apparatus may implement a bridging circuit in accordance with certain aspects disclosed herein. The processing circuit typically has a controller or processor 1316 that may include one or more microprocessors, microcontrollers, digital signal processors, sequencers and/or state machines. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the controller or processor 1316, the modules or circuits 1304, 1306 and 1308, and the processor-readable storage medium 1318. One or more physical layer circuits and/or modules 1314 may be provided to support communications over a communication link implemented using a multi-wire bus 1312, through an antenna 1322 (to a radio access network for example), and so on. The bus 1320 may also link various other circuits such as timing sources, peripherals, voltage regulators, and power management circuits, which are well known in the art, and therefore, will not be described any further.

The processor 1316 is responsible for general processing, including the execution of software, code and/or instructions stored on the processor-readable storage medium 1318. The processor-readable storage medium may include a non-transitory storage medium. The software, when executed by the processor 1316, causes the processing circuit 1302 to perform the various functions described supra for any particular apparatus. The processor-readable storage medium may be used for storing data that is manipulated by the processor 1316 when executing software. The processing circuit 1302 further includes at least one of the modules 1304, 1306 and 1308. The modules 1304, 1306 and 1308 may be software modules running in the processor 1316, resident/stored in the processor-readable storage medium 1318, one or more hardware modules coupled to the processor 1316, or some combination thereof. The modules 1304, 1306 and 1308 may include microcontroller instructions, state machine configuration parameters, or some combination thereof.

In one configuration, the apparatus 1300 includes modules and/or circuits 1308 configured to initiate one or more bootloaders, determine a system configuration and initialize controllers and circuits. The apparatus 1300 may include modules and/or circuits 1306 adapted to initialize, control or configure access control managers or circuits to implement an access control policy or configuration, and modules and/or circuits 1304 configured to initiate and participate in bus communication transactions.

In one example, the apparatus 1300 is a system that includes a primary IC having a communication controller configured to control access to a first serial bus for a plurality of subsystems in the primary IC, and a processing circuit. The system may include a PMIC that has a first bus interface circuit configured to couple the PMIC to the first serial bus, a second bus interface circuit configured to couple the PMIC to a second serial bus and an access control circuit configured to control access to the PMIC through the second serial bus. The processing circuit may be configured to write an access control configuration to the PMIC, the access control configuration defining write access rights for a secondary IC coupled to the PMIC through the second serial bus.

In some examples, the primary IC further includes an access control manager configured to block write commands directed through the primary IC to at least one register in the PMIC, or block write commands directed to the PMIC by one of the plurality of subsystems in the primary IC. The processing circuit may be further configured to write the access control configuration to the PMIC during initialization of the system following a system or device restart, reset or power on event, and configure the access control manager during the initialization of the system. The PMIC may be configured to ignore write commands received from the second serial bus following the system or device restart, reset or power on event and before the access control configuration is written to the PMIC.

In some examples, the access control circuit in the PMIC is further configured to block write commands received from the second serial bus and directed to a first register in the PMIC that is identified by the access control configuration as inaccessible through the second serial bus. The access control circuit in the PMIC may be further configured to block write commands received from the secondary IC and directed to a first register in the PMIC that is identified by the access control configuration as inaccessible from the secondary IC. The access control circuit in the PMIC may be further configured to ignore write commands received from the second serial bus when the write commands include a device address identified for blocking by the access control configuration. In some examples, the first serial bus is operated in accordance with a SPMI protocol. In some examples, the second serial bus is operated in accordance with an I2C protocol.

The processor-readable storage medium 1318 may store instructions which, when executed by at least one processor or state machine of the processing circuit 1302, cause the processor and/or processing circuit 1302 to configure a communication controller in a primary IC to control access to a PMIC through a first serial bus, and configure an access control circuit in the PMIC to control access to the PMIC through a second serial bus. The primary IC may include a plurality of subsystems. The access control circuit may be configured by writing an access control configuration to the PMIC, the access control configuration defining write access rights for a secondary IC coupled to the PMIC through the second serial bus.

The storage medium may include instructions that cause the processing circuit 1302 to configure an access control manager in the primary IC to block write commands directed to at least one register in the PMIC through the primary IC or directed to the PMIC by one of the plurality of subsystems in the primary IC.

The storage medium may include instructions that cause the processing circuit 1302 to write the access control configuration to the PMIC during an initialization following a system or device restart, reset or power on event, and configure the access control manager during the initialization.

The storage medium may include instructions that cause the processing circuit 1302 to configure the PMIC to ignore write commands received from the second serial bus following a system or device restart, reset or power on event and before the access control configuration is written to the PMIC.

The storage medium may include instructions that cause the processing circuit 1302 to configure the access control circuit in the PMIC to block write commands received from the second serial bus and directed to a first register in the PMIC that is identified by the access control configuration as inaccessible through the second serial bus.

The storage medium may include instructions that cause the processing circuit 1302 to configure the access control circuit in the PMIC to block write commands received from the secondary IC and directed to a first register in the PMIC that is identified by the access control configuration as inaccessible from the secondary IC.

The storage medium may include instructions that cause the processing circuit 1302 to configure the access control circuit in the PMIC to ignore write commands received from the second serial bus when the write commands include a device address identified for blocking by the access control configuration.

In some examples, the first serial bus is operated in accordance with a SPMI protocol. In some examples, the second serial bus is operated in accordance with an I2C protocol.

Some implementation examples are described in the following numbered clauses:

1. A system, comprising: a primary integrated circuit including: a communication controller configured to control access to a first serial bus for a plurality of subsystems in the primary integrated circuit; and a processing circuit; and a power management integrated circuit including: a first bus interface circuit configured to couple the power management integrated circuit to the first serial bus; a second bus interface circuit configured to couple the power management integrated circuit to a second serial bus; and an access control circuit configured to control access to the power management integrated circuit through the second serial bus, wherein the processing circuit is configured to write an access control configuration to the power management integrated circuit, the access control configuration defining write access rights for a secondary integrated circuit coupled to the power management integrated circuit through the second serial bus.

2. The system as described in clause 1, wherein the primary integrated circuit further includes an access control manager configured to: block write commands directed through the primary integrated circuit to at least one register in the power management integrated circuit; or block write commands directed to the power management integrated circuit by one of the plurality of subsystems in the primary integrated circuit.

3. The system as described in clause 2, wherein the processing circuit is further configured to: write the access control configuration to the power management integrated circuit during initialization of the system following a system or device restart, reset or power on event; and configure the access control manager during the initialization of the system.

4. The system as described in clause 3, wherein the power management integrated circuit is configured to ignore write commands received from the second serial bus following the system or device restart, reset or power on event and before the access control configuration is written to the power management integrated circuit.

5. The system as described in any of clauses 1-4, wherein the access control circuit in the power management integrated circuit is further configured to: block write commands received from the second serial bus and directed to a first register in the power management integrated circuit that is identified by the access control configuration as inaccessible through the second serial bus.

6. The system as described in any of clauses 1-5, wherein the access control circuit in the power management integrated circuit is further configured to: block write commands received from the secondary integrated circuit and directed to a first register in the power management integrated circuit that is identified by the access control configuration as inaccessible from the secondary integrated circuit.

7. The system as described in any of clauses 1-6, wherein the access control circuit in the power management integrated circuit is further configured to: ignore write commands received from the second serial bus when the write commands include a device address identified for blocking by the access control configuration.

8. The system as described in any of clauses 1-7, wherein the first serial bus is operated in accordance with a system power management interface protocol.

9. The system as described in any of clauses 1-8, wherein the second serial bus is operated in accordance with an Inter-Integrated Circuit protocol.

10. A method for managing access to a power management device, comprising: configuring a communication controller in a primary integrated circuit to control access to a power management integrated circuit through a first serial bus, the primary integrated circuit including a plurality of subsystems; and configuring an access control circuit in the power management integrated circuit to control access to the power management integrated circuit through a second serial bus, wherein configuring the access control circuit includes writing an access control configuration to the power management integrated circuit, the access control configuration defining write access rights for a secondary integrated circuit coupled to the power management integrated circuit through the second serial bus.

11. The method as described in clause 10, further comprising: configuring an access control manager in the primary integrated circuit to block write commands directed to at least one register in the power management integrated circuit through the primary integrated circuit or directed to the power management integrated circuit by one of the plurality of subsystems in the primary integrated circuit.

12. The method as described in clause 11, further comprising: writing the access control configuration to the power management integrated circuit during an initialization following a system or device restart, reset or power on event; and configuring the access control manager during the initialization.

13. The method as described in clause 12, further comprising: configuring the power management integrated circuit to ignore write commands received from the second serial bus following the system or device restart, reset or power on event and before the access control configuration is written to the power management integrated circuit.

14. The method as described in any of clauses 10-13, further comprising: configuring the access control circuit in the power management integrated circuit to block write commands received from the second serial bus and directed to a first register in the power management integrated circuit that is identified by the access control configuration as inaccessible through the second serial bus.

15. The method as described in any of clauses 10-14, further comprising: configuring the access control circuit in the power management integrated circuit to block write commands received from the secondary integrated circuit and directed to a first register in the power management integrated circuit that is identified by the access control configuration as inaccessible from the secondary integrated circuit.

16. The method as described in any of clauses 10-15, further comprising: configuring the access control circuit in the power management integrated circuit to ignore write commands received from the second serial bus when the write commands include a device address identified for blocking by the access control configuration.

17. The method as described in any of clauses 10-16, wherein the first serial bus is operated in accordance with a system power management interface protocol.

18. The method as described in any of clauses 10-17, wherein the second serial bus is operated in accordance with an Inter-Integrated Circuit protocol.

19. A non-transitory processor-readable storage medium having one or more instructions that, when executed by at least one processor of a processing circuit, cause the processing circuit to: configure a communication controller in a primary integrated circuit to control access to a power management integrated circuit through a first serial bus, the primary integrated circuit including a plurality of subsystems; and configure an access control circuit in the power management integrated circuit to control access to the power management integrated circuit through a second serial bus, wherein the access control circuit is configured by writing an access control configuration to the power management integrated circuit, the access control configuration defining write access rights for a secondary integrated circuit coupled to the power management integrated circuit through the second serial bus.

20. The storage medium as described in clause 19, further comprising instructions that cause the processing circuit to: configure an access control manager in the primary integrated circuit to block write commands directed to at least one register in the power management integrated circuit through the primary integrated circuit or directed to the power management integrated circuit by one of the plurality of subsystems in the primary integrated circuit.

21. The storage medium as described in clause 20, further comprising instructions that cause the processing circuit to: write the access control configuration to the power management integrated circuit during an initialization following a system or device restart, reset or power on event; and configure the access control manager during the initialization.

22. The storage medium as described in clause 21, further comprising instructions that cause the processing circuit to: configure the power management integrated circuit to ignore write commands received from the second serial bus following the system or device restart, reset or power on event and before the access control configuration is written to the power management integrated circuit.

23. The storage medium as described in any of clauses 19-22, further comprising instructions that cause the processing circuit to: configure the access control circuit in the power management integrated circuit to block write commands received from the second serial bus and directed to a first register in the power management integrated circuit that is identified by the access control configuration as inaccessible through the second serial bus.

24. The storage medium as described in any of clauses 19-23, further comprising instructions that cause the processing circuit to: configure the access control circuit in the power management integrated circuit to block write commands received from the secondary integrated circuit and directed to a first register in the power management integrated circuit that is identified by the access control configuration as inaccessible from the secondary integrated circuit.

25. The storage medium as described in any of clauses 19-24, further comprising instructions that cause the processing circuit to: configure the access control circuit in the power management integrated circuit to ignore write commands received from the second serial bus when the write commands include a device address identified for blocking by the access control configuration.

26. The storage medium as described in any of clauses 19-25, wherein the first serial bus is operated in accordance with a system power management interface protocol.

27. The storage medium as described in any of clauses 19-26, wherein the second serial bus is operated in accordance with an Inter-Integrated Circuit protocol.

28. An apparatus for managing access to a power management device, comprising: means for configuring a communication controller in a primary integrated circuit to control access to a power management integrated circuit through a first serial bus, the primary integrated circuit including a plurality of subsystems; and means for configuring an access control circuit in the power management integrated circuit to control access to the power management integrated circuit through a second serial bus, wherein the means for configuring the access control circuit is configured to write an access control configuration to the power management integrated circuit, the access control configuration defining write access rights for a secondary integrated circuit coupled to the power management integrated circuit through the second serial bus.

29. The apparatus as described in clause 28, further comprising: means for configuring an access control manager in the primary integrated circuit to block write commands directed to at least one register in the power management integrated circuit through the primary integrated circuit or directed to the power management integrated circuit by one of the plurality of subsystems in the primary integrated circuit.

30. The apparatus as described in clause 29, wherein the means for configuring the access control manager is configured to: write the access control configuration to the power management integrated circuit during an initialization following a system or device restart, reset or power on event; and configure the access control manager during the initialization.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A system, comprising:
a primary integrated circuit coupled to a power management integrated circuit through a first serial bus and comprising an access control manager configured to control access to the power management integrated circuit for a plurality of subsystems in the primary integrated circuit and for one or more devices provided external to the primary integrated circuit;
a secondary integrated circuit coupled to the power management integrated circuit through a second serial bus, wherein the secondary integrated circuit is provided external to the primary integrated circuit, and wherein the power management integrated circuit comprises an access control circuit configured to enforce an access control policy defined by the access control manager for the secondary integrated circuit by controlling accesses of the power management integrated circuit by the secondary integrated circuit through the second serial bus; and
a processing circuit configured to write an access control configuration to the access control circuit in the power management integrated circuit, the access control configuration comprising the access control policy, including write access rights for the secondary integrated circuit.

2. The system of claim 1, wherein the access control manager is further configured to:
block write commands directed through the primary integrated circuit to at least one register in the power management integrated circuit; or
block write commands directed to the power management integrated circuit by one of the plurality of subsystems in the primary integrated circuit or by the one or more devices provided external to the primary integrated circuit.

3. The system of claim 1, wherein the processing circuit is further configured to:
write the access control configuration to the power management integrated circuit during initialization of the system following a system or device restart, reset or power on event; and
configure the access control manager during the initialization of the system,
wherein the access control configuration causes the access control circuit to prevent the power management integrated circuit from processing or otherwise responding to one or more commands received from the secondary integrated circuit.

4. The system of claim 3, wherein the power management integrated circuit is configured to ignore write commands received from the second serial bus following the system or device restart, reset or power on event and before the access control configuration is written to the power management integrated circuit.

5. The system of claim 1, wherein the access control circuit in the power management integrated circuit is further configured to:
block write commands received from the second serial bus and directed to a first register in the power management integrated circuit that is identified by the access control configuration as inaccessible through the second serial bus.

6. The system of claim 1, wherein the access control circuit in the power management integrated circuit is further configured to:
block write commands received from the secondary integrated circuit and directed to a first register in the power management integrated circuit that is identified by the access control configuration as inaccessible from the secondary integrated circuit.

7. The system of claim 1, wherein the access control circuit in the power management integrated circuit is further configured to:
ignore write commands received from the second serial bus when the write commands include a device address identified for blocking by the access control configuration.

8. The system of claim 1, wherein the first serial bus is operated in accordance with a system power management interface protocol.

9. The system of claim 1, wherein the second serial bus is operated in accordance with an Inter-Integrated Circuit protocol.

10. A method for managing access to a power management device, comprising:
configuring an access control manager in a primary integrated circuit to control access to a power management integrated circuit for a plurality of subsystems in the primary integrated circuit and for one or more devices provided external to the primary integrated circuit, wherein the primary integrated circuit is coupled to the power management integrated circuit through a first serial bus; and
configuring an access control circuit in the power management integrated circuit to enforce an access control policy defined by the access control manager for a secondary integrated circuit,
wherein enforcing the access control policy includes controlling access to the power management integrated circuit by the secondary integrated circuit through a second serial bus, and
wherein configuring the access control circuit includes writing an access control configuration to the access control circuit in the power management integrated circuit, the access control configuration comprising the access control policy, including write access rights for the secondary integrated circuit.

11. The method of claim 10, further comprising:
configuring the access control manager in the primary integrated circuit to block write commands directed to at least one register in the power management integrated circuit through the primary integrated circuit or directed to the power management integrated circuit by one of the plurality of subsystems in the primary integrated circuit or by the one or more devices provided external to the primary integrated circuit.

12. The method of claim 10, further comprising:
writing the access control configuration to the power management integrated circuit during an initialization following a system or device restart, reset or power on event; and
configuring the access control manager during the initialization,
wherein the access control configuration causes the access control circuit to prevent the power management integrated circuit from processing or otherwise responding to one or more commands received from the secondary integrated circuit.

13. The method of claim 12, further comprising:
configuring the power management integrated circuit to ignore write commands received from the second serial bus following the system or device restart, reset or power on event and before the access control configuration is written to the power management integrated circuit.

14. The method of claim 10, further comprising:
configuring the access control circuit in the power management integrated circuit to block write commands received from the second serial bus and directed to a first register in the power management integrated circuit that is identified by the access control configuration as inaccessible through the second serial bus.

15. The method of claim 10, further comprising:
configuring the access control circuit in the power management integrated circuit to block write commands received from the secondary integrated circuit and directed to a first register in the power management integrated circuit that is identified by the access control configuration as inaccessible from the secondary integrated circuit.

16. The method of claim 10, further comprising:
configuring the access control circuit in the power management integrated circuit to ignore write commands received from the second serial bus when the write commands include a device address identified for blocking by the access control configuration.

17. The method of claim 10, wherein the first serial bus is operated in accordance with a system power management interface protocol.

18. The method of claim 10, wherein the second serial bus is operated in accordance with an Inter-Integrated Circuit protocol.

19. A non-transitory processor-readable storage medium having one or more instructions that, when executed by at least one processor of a processing circuit, cause the processing circuit to:
configure an access control manager in a primary integrated circuit to control access to a power management integrated circuit for a plurality of subsystems in the primary integrated circuit and for one or more devices provided external to the primary integrated circuit, wherein the primary integrated circuit is coupled to the power management integrated circuit through a first serial bus; and
configure an access control circuit in the power management integrated circuit to enforce an access control policy defined by the access control manager for a secondary integrated circuit,
wherein enforcing the access control policy includes controlling access to the power management integrated circuit by the secondary integrated circuit through a second serial bus, and
wherein the access control circuit is configured by writing an access control configuration to the access control circuit in the power management integrated circuit, the access control configuration comprising the access control policy, including write access rights for the secondary integrated circuit.

20. The storage medium of claim 19, further comprising instructions that cause the processing circuit to:
configure the access control manager in the primary integrated circuit to block write commands directed to at least one register in the power management integrated circuit through the primary integrated circuit or directed to the power management integrated circuit by one of the plurality of subsystems in the primary integrated circuit or by the one or more devices provided external to the primary integrated circuit.

21. The storage medium of claim 19, further comprising instructions that cause the processing circuit to:
write the access control configuration to the power management integrated circuit during an initialization following a system or device restart, reset or power on event; and
configure the access control manager during the initialization,
wherein the access control configuration causes the access control circuit to prevent the power management integrated circuit from processing or otherwise responding to one or more commands received from the secondary integrated circuit.

22. The storage medium of claim 21, further comprising instructions that cause the processing circuit to:
configure the power management integrated circuit to ignore write commands received from the second serial bus following the system or device restart, reset or power on event and before the access control configuration is written to the power management integrated circuit.

23. The storage medium of claim 19, further comprising instructions that cause the processing circuit to:
configure the access control circuit in the power management integrated circuit to block write commands received from the second serial bus and directed to a first register in the power management integrated circuit that is identified by the access control configuration as inaccessible through the second serial bus.

24. The storage medium of claim 19, further comprising instructions that cause the processing circuit to:
configure the access control circuit in the power management integrated circuit to block write commands received from the secondary integrated circuit and directed to a first register in the power management integrated circuit that is identified by the access control configuration as inaccessible from the secondary integrated circuit.

25. The storage medium of claim 19, further comprising instructions that cause the processing circuit to:
configure the access control circuit in the power management integrated circuit to ignore write commands received from the second serial bus when the write commands include a device address identified for blocking by the access control configuration.

26. The storage medium of claim 19, wherein the first serial bus is operated in accordance with a system power management interface protocol.

27. The storage medium of claim 19, wherein the second serial bus is operated in accordance with an Inter-Integrated Circuit protocol.

28. An apparatus for managing access to a power management device, comprising:

means for configuring an access control manager in a primary integrated circuit to control access to a power management integrated circuit for a plurality of subsystems in the primary integrated circuit and for one or more devices provided external to the primary integrated circuit, wherein the primary integrated circuit is coupled to the power management integrated circuit through a first serial bus; and means for configuring an access control circuit in the power management integrated circuit to enforce an access control policy defined by the access control manager for a secondary integrated circuit, wherein enforcing the access control policy includes controlling access to the power management integrated circuit by the secondary integrated circuit through a second serial bus, and wherein the means for configuring the access control circuit is configured to write an access control configuration to the access control circuit in the power management integrated circuit, the access control configuration comprising the access control policy, including write access rights for the secondary integrated circuit.

29. The apparatus of claim 28, wherein the access control manager in the primary integrated circuit is configured to block write commands directed to at least one register in the power management integrated circuit through the primary integrated circuit or directed to the power management integrated circuit by one of the plurality of subsystems in the primary integrated circuit or by the one or more devices provided external to the primary integrated circuit.

30. The apparatus of claim 28, wherein the means for configuring the access control manager is configured to:

write the access control configuration to the power management integrated circuit during an initialization following a system or device restart, reset or power on event; and configure the access control manager during the initialization, wherein the access control configuration causes the access control circuit to prevent the power management integrated circuit from processing or otherwise responding to one or more commands received from the secondary integrated circuit.

\* \* \* \* \*